(12) United States Patent
Meshkati et al.

(10) Patent No.: US 12,143,947 B2
(45) Date of Patent: Nov. 12, 2024

(54) TECHNIQUES FOR SCALING A TRANSMIT POWER LIMIT

(71) Applicant: QUALCOMM Incorporated, San Diego, CA (US)

(72) Inventors: Farhad Meshkati, San Diego, CA (US); Brian Clarke Banister, San Diego, CA (US); Michael Lee McCloud, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 341 days.

(21) Appl. No.: 17/654,420

(22) Filed: Mar. 11, 2022

(65) Prior Publication Data
US 2022/0386249 A1    Dec. 1, 2022

Related U.S. Application Data

(60) Provisional application No. 63/193,304, filed on May 26, 2021.

(51) Int. Cl.
*H04W 52/00*     (2009.01)
*H04W 52/14*     (2009.01)
*H04W 52/36*     (2009.01)
*H04W 76/15*     (2018.01)

(52) U.S. Cl.
CPC ....... *H04W 52/367* (2013.01); *H04W 52/146* (2013.01); *H04W 76/15* (2018.02)

(58) Field of Classification Search
CPC .. H04W 52/367; H04W 52/146; H04W 76/15
See application file for complete search history.

(56) References Cited

U.S. PATENT DOCUMENTS

2018/0070320 A1    3/2018  Forrester et al.

FOREIGN PATENT DOCUMENTS

| EP | 2695237 B1 * | 7/2017 | ............. H01Q 1/245 |
| EP | 3567940 A1 | 11/2019 | |
| EP | 4024715 A1 | 7/2022 | |
| WO | WO-2020242701 A1 * | 12/2020 | ........... H04B 7/0695 |
| WO | 2021043153 A1 | 3/2021 | |

OTHER PUBLICATIONS

International Search Report and Written Opinion—PCT/US2022/072004—ISA/EPO—Aug. 26, 2022.

* cited by examiner

*Primary Examiner* — Erika A Washington
(74) *Attorney, Agent, or Firm* — Dalei Dong; Harrity & Harrity, LLP

(57) ABSTRACT

Various aspects of the present disclosure generally relate to wireless communication. In some aspects, a user equipment (UE) may identify a first transmit power limit based at least in part on at least one of a specific absorption rate limit, a maximum permissible exposure limit, or a power density limit. The UE may modify, based at least in part on a scaling factor associated with a time interval, the first transmit power limit to obtain a modified first transmit power limit. The UE may transmit a signal based at least in part on the modified first transmit power limit. Numerous other aspects are described.

30 Claims, 7 Drawing Sheets

TECHNIQUES FOR SCALING A TRANSMIT POWER LIMIT

CROSS-REFERENCE TO RELATED APPLICATION

This Patent Application claims priority to U.S. Provisional Patent Application No. 63/193,304, filed on May 26, 2021, entitled "TECHNIQUES FOR SCALING A TRANSMIT POWER LIMIT," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for scaling a transmit power limit.

DESCRIPTION OF RELATED ART

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a base station via the downlink and uplink. The downlink (or forward link) refers to the communication link from the base station to the UE, and the uplink (or reverse link) refers to the communication link from the UE to the base station. As will be described in more detail herein, a base station may be referred to as a Node B, a gNB, an access point (AP), a radio head, a transmit receive point (TRP), a New Radio (NR) base station, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a user equipment (UE) includes identifying a first transmit power limit based at least in part on at least one of a specific absorption rate limit, a maximum permissible exposure limit, or a power density limit; modifying, based at least in part on a scaling factor associated with a time interval, the first transmit power limit to obtain a modified first transmit power limit; and transmitting a signal based at least in part on the modified first transmit power limit.

In some aspects, a UE for wireless communication includes a memory and one or more processors, coupled to the memory, configured to: identify a first transmit power limit based at least in part on at least one of a specific absorption rate limit, a maximum permissible exposure limit, or a power density limit; modify, based at least in part on a scaling factor associated with a time interval, the first transmit power limit to obtain a modified first transmit power limit; and transmit a signal based at least in part on the modified first transmit power limit.

In some aspects, a non-transitory computer-readable medium storing a set of instructions for wireless communication includes one or more instructions that, when executed by one or more processors of a UE, cause the UE to: identify a first transmit power limit based at least in part on at least one of a specific absorption rate limit, a maximum permissible exposure limit, or a power density limit; modify, based at least in part on a scaling factor associated with a time interval, the first transmit power limit to obtain a modified first transmit power limit; and transmit a signal based at least in part on the modified first transmit power limit.

In some aspects, an apparatus for wireless communication includes means for identifying a first transmit power limit based at least in part on at least one of a specific absorption rate limit, a maximum permissible exposure limit, or a power density limit; means for modifying, based at least in part on a scaling factor associated with a time interval, the first transmit power limit to obtain a modified first transmit power limit; and means for transmitting a signal based at least in part on the modified first transmit power limit.

Aspects generally include a method, apparatus, system, computer program product, non-transitory computer-readable medium, user equipment, base station, network entity, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
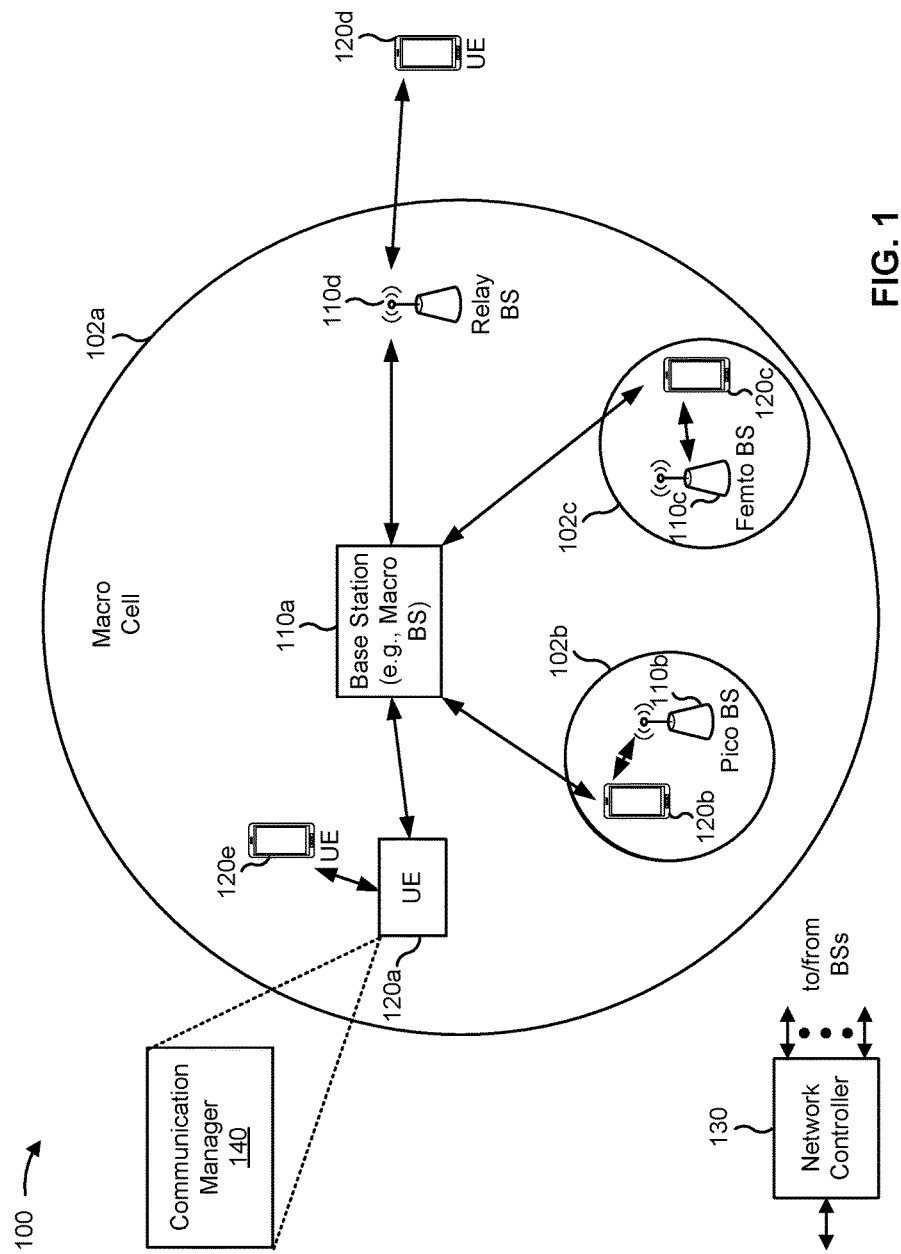
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR base station, a Node B, a gNB, a 5G node B (NB), an access point, a transmit receive point (TRP), or the like. Each base station may provide communication coverage for a particular geographic area. In 3GPP, the term "cell" can refer to a coverage area of a base station and/or a base station subsystem serving this coverage area, depending on the context in which the term is used.

A base station may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A base station for a macro cell may be referred to as a macro base station. A base station for a pico cell may be referred to as a pico base station. A base station for a femto cell may be referred to as a femto base station or a home base station. In the example shown in FIG. 1, a base station 110a may be a macro base station for a macro cell 102a, a base station 110b may be a pico base station for a pico cell 102b, and a base station 110c may be a femto base station for a femto cell 102c. A base station may support one or multiple (e.g., three) cells. The terms "eNB", "base station", "NR base station", "gNB", "TRP", "AP", "node B", "5G NB", and "cell" may be used interchangeably herein.

In some aspects, the term "base station" (e.g., the base station 110) or "network entity" may refer to an aggregated base station, a disaggregated base station, an integrated access and backhaul (IAB) node, a relay node, and/or one or more components thereof. For example, in some aspects, "base station" or "network entity" may refer to a central unit (CU), a distributed unit (DU), a radio unit (RU), a Near-Real Time (Near-RT) RAN Intelligent Controller (RIC), or a Non-Real Time (Non-RT) RIC, or a combination thereof. In some aspects, the term "base station" or "network entity" may refer to one device configured to perform one or more functions, such as those described herein in connection with the base station 110. In some aspects, the term "base station" or "network entity" may refer to a plurality of devices configured to perform the one or more functions. For example, in some distributed systems, each of a number of different devices (which may be located in the same geographic location or in different geographic locations) may be configured to perform at least a portion of a function, or to duplicate performance of at least a portion of the function, and the term "base station" or "network entity" may refer to any one or more of those different devices. In some aspects, the term "base station" or "network entity" may refer to one or more virtual base stations and/or one or more virtual base station functions. For example, in some aspects, two or more base station functions may be instantiated on a single device. In some aspects, the term "base station" or "network entity" may refer to one of the base station functions and not another. In this way, a single device may include more than one base station.

In some aspects, a cell may not necessarily be stationary, and the geographic area of the cell may move according to the location of a mobile base station. In some aspects, the base stations may be interconnected to one another and/or to one or more other base stations or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a base station or a UE) and send a transmission of the data to a downstream station (e.g., a UE or a base station). A relay station may also be a UE that can relay transmissions for other UEs. In the example shown in FIG. 1, a relay base station 110d may communicate with macro base station 110a and a UE 120d in order to facilitate communication between base station 110a and UE 120d. A relay base station may also be referred to as a relay station, a relay base station, a relay, or the like.

Wireless network 100 may be a heterogeneous network that includes base stations of different types, such as macro base stations, pico base stations, femto base stations, relay base stations, or the like. These different types of base stations may have different transmit power levels, different coverage areas, and different impacts on interference in wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to a set of base stations and may provide coordination and control for these base stations. Network controller 130 may communicate with the base stations via a backhaul. The base stations may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

In some aspects, the UE 120 may include a communication manager 140. As described in more detail elsewhere herein, the communication manager 140 may identify a first transmit power limit based at least in part on at least one of a specific absorption rate limit, a maximum permissible exposure limit, or a power density limit; modify, based at least in part on a scaling factor associated with a time interval, the first transmit power limit to obtain a modified first transmit power limit; and transmit a signal based at least in part on the modified first transmit power limit. Additionally, or alternatively, the communication manager 140 may perform one or more other operations described herein.

As indicated above, FIG. 1 is provided as an example. Other examples may differ from what is described with regard to FIG. 1.

Figure 2:
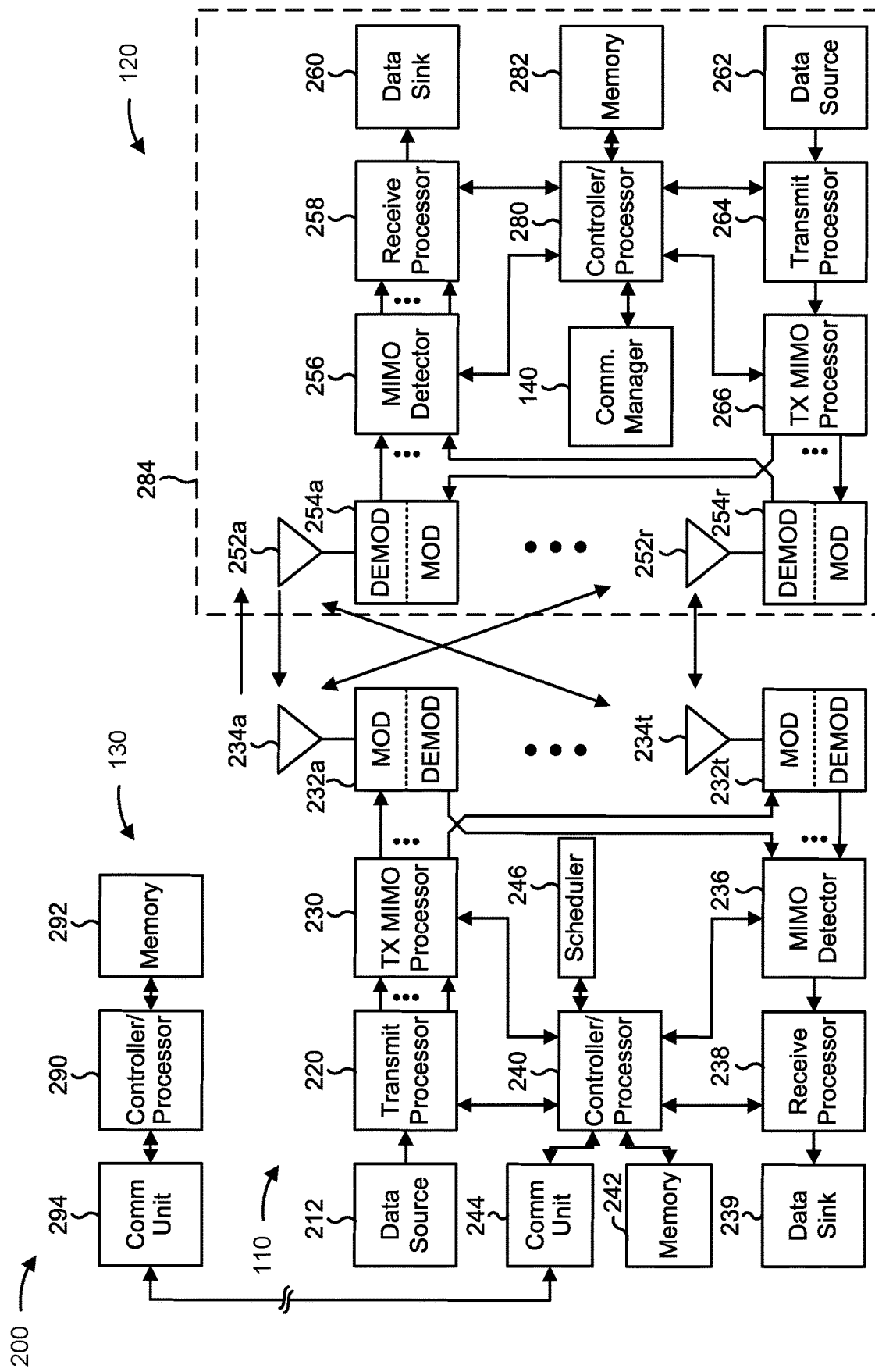
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, an/or a CQI parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 4-6).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 4-6).

Controller/processor 240 of base station 110, controller/processor 280 of UE 120, and/or any other component(s) of FIG. 2 may perform one or more techniques associated with scaling a transmit power limit, as described in more detail elsewhere herein. For example, controller/processor 240 of base station 110, controller/processor 280 of UE 120, and/or any other component(s) of FIG. 2 may perform or direct operations of, for example, process 600 of FIG. 6 and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 600 of FIG. 6 and/or other processes as described herein. In some aspects, executing instructions may include running the instructions, converting the instructions, compiling the instructions, and/or interpreting the instructions.

In some aspects, the UE 120 includes means for identifying a first transmit power limit based at least in part on at least one of a specific absorption rate limit, a maximum permissible exposure limit, or a power density limit; means for modifying, based at least in part on a scaling factor associated with a time interval, the first transmit power limit to obtain a modified first transmit power limit; and/or means for transmitting a signal based at least in part on the modified first transmit power limit, among other examples. The means for the UE 120 to perform operations described herein may include, for example, one or more of communication manager 140, antenna 252, demodulator 254, MIMO detector 256, receive processor 258, transmit processor 264, TX MIMO processor 266, modulator 254, controller/processor 280, or memory 282.

As indicated above, FIG. 2 is provided as an example. Other examples may differ from what is described with regard to FIG. 2.

Deployment of communication systems, such as 5G New Radio (NR) systems, may be arranged in multiple manners with various components or constituent parts. In a 5G NR system, or network, a network node, a network entity, a mobility element of a network, a radio access network (RAN) node, a core network node, a network element, a base station, or a network equipment may be implemented in an aggregated or disaggregated architecture. For example, a base station (such as a Node B (NB), evolved NB (eNB), NR base station (BS), 5G NB, gNodeB (gNB), access point (AP), transmit receive point (TRP), or cell), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station may be configured to utilize a radio protocol stack that is physically or logically integrated within a single RAN node (for example, within a single device or unit). A disaggregated base station may be configured to utilize a protocol stack that is physically or logically distributed among two or more units (such as one or more CUs, one or more DUs, or one or more RUs). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU, and RU also may be implemented as virtual units (e.g., a virtual central unit (VCU), a virtual distributed unit (VDU), or a virtual radio unit (VRU)).

Base station-type operation or network design may consider aggregation characteristics of base station functionality. For example, disaggregated base stations may be utilized in an integrated access backhaul (TAB) network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that may be individually deployed. A disaggregated base station may include functionality implemented across two or more units at various physical locations, as well as functionality implemented for at least one unit virtually, which may enable flexibility in network design. The various units of the disaggregated base station may be configured for wired or wireless communication with at least one other unit of the disaggregated base station.

Figure 3:
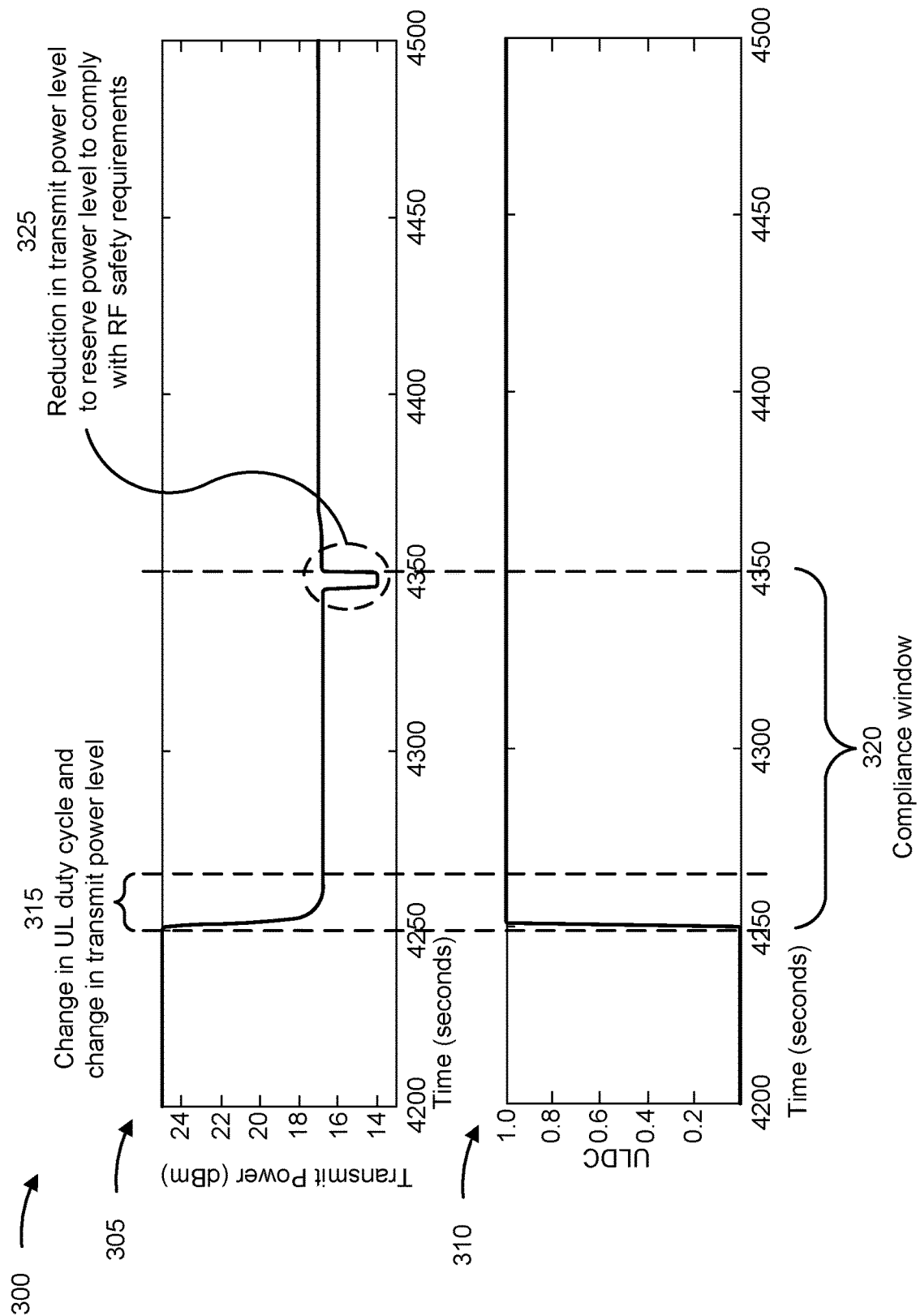
FIG. 3 is a diagram illustrating an example associated with a UE adapting transmit power over a compliance window to satisfy a radio frequency (RF) emissions limitation, in accordance with the present disclosure.

FIG. 3 is a diagram illustrating an example 300 associated with a UE adapting transmit power over a compliance window to satisfy a radio frequency (RF) emissions limitation, in accordance with the present disclosure. As shown in FIG. 3, and by graph 305, a UE may adjust a transmit power level over time. As shown by graph 310, an uplink duty cycle (ULDC) of the UE may change over time.

Because UEs may emit RF waves, microwaves, and/or other radiation, UEs are generally subject to regulatory RF safety requirements that set forth specific guidelines, or maximum permissible exposure (MPE) limits, that constrain various operations that the UEs can perform. For example, RF emissions may generally increase when a UE is transmitting, and the RF emissions may further increase in cases where the UE is performing frequent transmissions, and/or high-power transmissions, among other examples. Accordingly, because frequent and/or high-power transmission may lead to significant RF emissions, regulatory agencies (e.g., the Federal Communications Commission (FCC) in the United States or other agencies in other jurisdictions) may provide information related to acceptable RF radiation exposure when UEs are communicating using different radio access technologies.

For example, when a UE is communicating using radio access technologies that operate in a frequency range below 6 GHz, the applicable RF exposure parameter is a specific absorption rate (SAR), which corresponds to a rate at which the human body absorbs energy when exposed to RF energy (e.g., power absorbed per unit of mass, which may be expressed according to watts per kilogram (W/kg)). In particular, SAR requirements generally specify that overall radiated power by a UE is to remain under a certain level to limit heating that may occur when RF energy is absorbed. In another example, when a UE is communicating using a radio access technology that operates in a high frequency range, such as a millimeter wave (mmW) frequency range, the applicable RF exposure parameter is power density, which may be regulated to limit heating of the UE and/or nearby surfaces.

Accordingly, UEs generally have to satisfy MPE limits, which are typically regulatory requirements that are defined in terms of aggregate exposure over a certain amount of time, and the aggregate exposure may be averaged over a compliance window (e.g., a moving or sliding time window). For example, a UE may be subject to an average power limit ($P_{limit}$) that corresponds to an average power at which an SAR limit or an MPE limit is satisfied if the UE were to transmit substantially continuously over a moving compliance window of N seconds (e.g., 100 seconds or 200 slots, assuming a slot duration of 0.5 seconds). Accordingly, the UE can use an instantaneous transmit power that exceeds the average power limit for a period of time provided that the average power over the moving compliance window is under the average power limit at which the SAR limit or the MPE limit is satisfied. For example, the UE may transmit at a maximum transmit power at the start of the moving compliance window and then reduce the instantaneous transmit power until the moving compliance window ends in order to ensure that the SAR limit or the MPE limit on aggregate exposure is satisfied over the entire moving compliance window. In general, the UE may reduce the instantaneous transmit power to a reserve power level ($P_{reserve}$), which may be a minimum transmit power level to maintain a link with a base station.

In some cases, a UE may determine a transmit power (e.g., an instantaneous transmit power) based on scaling the average power limit ($P_{limit}$) by an uplink duty cycle. For example, the UE may estimate a current uplink duty cycle and may scale the average power limit by the estimated current uplink duty cycle. "Duty cycle" may refer to a fraction or portion of a period of time in which the UE is active (e.g., is transmitting). For example, an uplink duty cycle may indicate a percentage of time that the UE is actively transmitting uplink transmissions over a period of time. In other words, an uplink duty cycle of 1.0 (or 100%) may indicate that the UE 120 is transmitting for an entire period of time; whereas an uplink duty cycle of 0.5 (or 50%) may indicate that the UE 120 is transmitting for half of the period of time. For example, if the uplink duty cycle is 0.5 and the average power limit is 17 decibels-milliwatts (dBm), then the UE 120 may transmit at a transmit power level of 20 dBm, as the UE 120 is only transmitting 50% of the time (e.g., resulting in an average transmit power level of 17 dBm, as required by the MPE limit or the SAR limit).

The UE may select the instantaneous transmit power based on a maximum transmit power ($P_{max}$) (e.g., for the UE, for an antenna of the UE, and/or for a serving base station) and the scaled average power limit. Using the scaled average $P_{limit}$ that is based on the estimated current uplink duty cycle may enable the UE to select an optimal transmit power while still ensuring that RF safety requirements are satisfied. However, as the UE may be unaware of a change in the uplink duty cycle, there may be a delay in the estimation of the uplink duty cycle (e.g., as compared to the actual uplink duty cycle), resulting in a delay in a transition to, or a convergence on, the scaled average $P_{limit}$. For example, as shown by reference number 315, for a period of time during a compliance window 320, the UE 120 may be transmitting at a transmit power level that is greater than the scaled average $P_{limit}$. As a result, the UE may exceed an SAR limit or an MPE limit on aggregate exposure over the compliance window 320. As shown by reference number 325, exceeding the SAR limit or the MPE limit on aggregate exposure over the compliance window 320 may result in the UE reducing the transmit power (e.g., to the reserve power level ($P_{reserve}$)) to comply with RF safety requirements. Reducing the transmit power may result in performance degradation for the UE, such as a reduction in coverage for the UE, poor call performance, and/or reduced reliability, among other examples.

Some techniques and apparatuses described herein enable scaling of a transmit power limit. For example, a transmit power limit (e.g., the average power limit) may be scaled (e.g., reduced or backed off) to mitigate a risk of exceeding an SAR limit or an MPE limit on aggregate exposure over a compliance window caused by a transition time to the scaled average power limit. For example, the UE may identify a transmit power limit (e.g., the average power limit) that is based at least in part on an SAR limit, an MPE limit, and/or a power density limit. The UE 120 may determine a scaling factor. The scaling factor may modify or reduce the transmit power limit to ensure that the SAR limit or the MPE limit on aggregate exposure over a compliance window is not exceeded by the UE. As a result, the UE may use transmit power levels that do not cause the UE to exceed the SAR limit or the MPE limit on aggregate exposure over a compliance window. For example, the UE may be enabled to select an optimized transmit power level (e.g., that is based at least in part on an estimated uplink duty cycle), while also mitigating the risk of exceeding an SAR limit or an MPE limit on aggregate exposure over a compliance window caused by a transition time to the scaled average power limit. Therefore, the UE may not reduce a transmit power level to a reserve power level (e.g., as may have otherwise been needed to ensure that the SAR limit or the MPE limit is satisfied). Avoiding reducing the transmit power level to the reserve power level may improve performance of the UE by enabling the UE to consistently transmit at higher transmit power levels.

For example, the scaling factor may be based at least in part on a size of a compliance window, the transmit power limit (e.g., the average power limit, another transmit power limit (e.g., a maximum transmit power ($P_{max}$)), an uplink duty cycle, a change in (or rate of change of) the uplink duty cycle, and/or an estimation filter coefficient (e.g., an infinite impulse response (IIR) coefficient), among other examples. For example, the scaling factor may be a value that is determined to ensure that a transmit power level of the UE does not cause the SAR limit or the MPE limit on aggregate exposure over a compliance window to be exceeded when the UE utilizes an estimated uplink duty cycle for transmit power level determinations.

The UE may select a transmit power level based at least in part on the transmit power limit (e.g., the average power limit and the scaling factor. For example, the UE may modify the transmit power limit (e.g., the average power limit by the scaling factor. In some aspects, the UE may modify the transmit power limit (e.g., the average power limit) by the scaling factor and may scale the modified transmit power level by an estimated uplink duty cycle (e.g., to obtain a scaled average power limit). The UE may select the transmit power level based at least in part on the scaled average power limit (e.g., where the average power limit is modified by the scaling factor and/or modified by the estimated uplink duty cycle).

Figure 4:
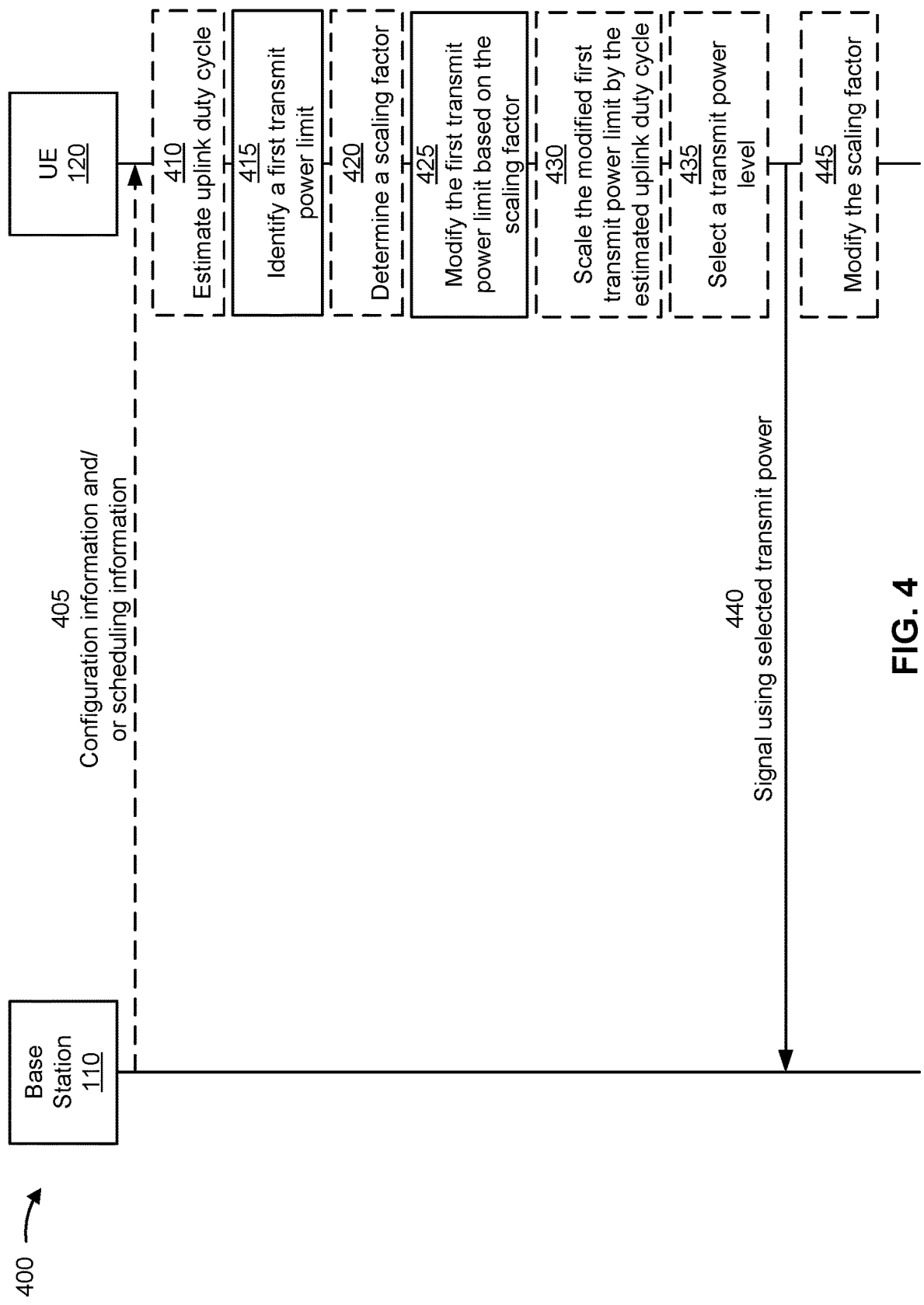
FIG. 4 is a diagram illustrating an example associated with scaling a transmit power limit, in accordance with the present disclosure.

FIG. 4 is a diagram illustrating an example 400 associated with scaling a transmit power limit, in accordance with the present disclosure. As shown in FIG. 4, a network entity (e.g., depicted and described herein as a base station 110 as an example) and a UE 120 may communicate with one another in a wireless network, such as the wireless network 100. As shown in FIG. 4, the UE 120 may adaptively select a transmit power level based at least in part on applying a scaling factor to a transmit power limit, such as an average power limit ($P_{limit}$) that corresponds to an average power at which an SAR limit or an MPE limit is satisfied if the UE were to transmit substantially continuously over a moving compliance window.

As shown by reference number 405, the base station 110 may transmit, and the UE 120 may receive, configuration information. In some aspects, the UE 120 may receive the configuration information via one or more of radio resource control (RRC) signaling, medium access control (MAC) control element (MAC-CE) signaling, and/or downlink control information (DCI) signaling, among other examples. In some aspects, the configuration information may include an indication of one or more configuration parameters (e.g., already stored by the UE 120) for selection by the UE 120, and/or explicit configuration information for the UE 120 to use to configure the UE 120, among other examples. For example, the configuration information may indicate one or more transmit power control parameters. In some aspects, the configuration information may indicate a transmit power limit (e.g., a maximum transmit power) that can be used by the UE 120 for uplink transmissions to the base station 110.

In some aspects, the configuration information may indicate an uplink duty cycle associated with the UE 120. For example, an RRC parameter may indicate an uplink duty cycle. In some aspects, an RRC parameter may indicate a maximum uplink duty cycle for the UE 120. In some aspects, the configuration information may indicate an uplink duty cycle (e.g., a maximum uplink duty cycle) for the UE 120 for one or more operating frequency bands.

The UE 120 may configure the UE 120 based at least in part on the configuration information. In some aspects, the UE 120 may be configured to perform one or more operations described herein based at least in part on the configuration information.

In some aspects, the base station 110 may transmit, and the UE 120 may receive, scheduling information. The scheduling information may schedule one or more communications. For example, the scheduling information may schedule the UE 120 to transmit one or more uplink communications. In some aspects, an uplink duty cycle (e.g., an actual uplink duty cycle of the UE 120) may be based at least in part on the scheduled uplink communications. In other words, the uplink duty cycle (e.g., the actual uplink duty cycle of the UE 120) may be based at least in part on the number and/or duration of uplink communications transmitted by the UE 120.

However, the UE 120 may be unaware of future scheduling information to be transmitted by the base station 110. In other words, the UE 120 may be unaware of a number of future uplink communications that may be scheduled and/or a duration of future uplink communications that may be scheduled. As described elsewhere herein, it may be beneficial to use the uplink duty cycle when selecting a transmit power level for the UE 120 (e.g., to adjust or scale an average power limit ($P_{limit}$) to optimize the selected transmit power level while also mitigating a risk that an MPE limit or an SAR limit is not exceeded over a compliance window).

Therefore, in some aspects, as shown by reference number 410, the UE 120 may estimate an uplink duty cycle. For example, the UE 120 may estimate the uplink duty cycle based at least in part on previous uplink duty cycles and/or previous estimates of the uplink duty cycle (e.g., based at least in part on past observations of the uplink duty cycle). In some aspects, the UE 120 may use a filter, such as an IIR filter, to estimate the uplink duty cycle. For example, the UE 120 may use an equation (1) having the following form to estimate the uplink duty cycle.

$$u_f(n) = \alpha \times u(n) + (1-\alpha) \times u_f(n-1) \quad (1)$$

In equation (1), $u_f(n)$ corresponds to the estimated uplink duty cycle, α corresponds to an estimation filter coefficient (e.g., an IIR filter coefficient), u(n) corresponds to a current uplink duty cycle, and $u_f(n-1)$ corresponds to a previously estimated uplink duty cycle. There may be an amount of time associated with the UE 120 transitioning to, or converging on, the actual uplink duty cycle when the UE 120 is estimating the uplink duty cycle (e.g., using equation (1)). For example, as described in connection with FIG. 3, when the actual uplink duty cycle changes, there may be some amount of transient time in which the estimated uplink duty cycle lags behind the actual uplink duty cycle. The amount of transient time may be based at least in part on an estimation filter coefficient (e.g., an IIR filter coefficient, α) used by the UE 120.

In some aspects, the UE 120 may predict a future or an upcoming uplink duty cycle. For example, the UE 120 may predict the future or upcoming uplink duty cycle based at least in part on past actions performed by the base station 110 (e.g., past scheduling actions). For example, the UE 120 may predict the future or upcoming uplink duty cycle based at least in part on previously scheduled uplink communications. In some aspects, the base station 110 may use repetitive and/or predictable scheduling patterns, such as when semi-persistent scheduling is used by the base station 110. Therefore, the UE 120 may be enabled to predict future scheduling information for the UE 120 to enable the UE 120 to predict the future or upcoming uplink duty cycle.

In some aspects, the UE 120 may predict the future or upcoming uplink duty cycle based at least in part on a model, such as a machine learning model or an artificial intelligence model. For example, the UE 120 may train the model using a training set that consists of previous scheduling information for the UE 120 (e.g., previous scheduling patterns for uplink communications transmitted by the UE 120). The model may be trained to predict future or upcoming uplink duty cycles for the UE 120. Therefore, once the model is trained, the UE 120 may input a set of previous transmission occasions (e.g., a set of previous uplink transmissions by the UE 120) and/or a set of previous uplink duty cycles of the UE 120, among other examples, to the model. The model may output a predicted uplink duty cycle for the UE 120. The UE 120 may use the predicted uplink duty cycle for transmit power level determinations, as described in more detail elsewhere herein.

As shown by reference number 415, the UE 120 may identify a first transmit power limit based at least in part on an SAR limit, an MPE limit, or a power density limit, among other examples. For example, the first transmit power limit may be based at least in part on regulatory requirements that are defined in terms of aggregate RF exposure over an amount of time. In other words, the first transmit power limit may be an average power limit ($P_{limit}$) that corresponds to an average power at which an SAR limit or an MPE limit is satisfied if the UE were to transmit substantially continuously over a moving compliance window, as described elsewhere herein. In some aspects, the UE 120 may identify the first transmit power limit based at least in part on the configuration information. In some aspects, the first transmit power limit may be predetermined and/or preconfigured at the UE 120 (e.g., in an original equipment manufacturer (OEM) configuration). For example, the first transmit power limit may be based at least in part on guidelines set by a regulatory agency, such as the FCC in the United States. In some aspects, the first transmit power limit may be different for different antennas or different antenna groups of the UE 120. Therefore, in some aspects, the UE 120 may identify a first transmit power limit for an antenna or an antenna group that is to be used by the UE 120 for one or more upcoming uplink communications.

As shown by reference number 420, in some aspects, the UE 120 may determine a scaling factor. The scaling factor may be a parameter that is used to modify the first transmit power limit to ensure that a total energy consumption by the UE 120 over a compliance window (e.g., over a moving compliance window) is at or below an allowed regulatory level. For example, the scaling factor may be used to marginally reduce the first transmit power level to account for transient times associated with estimating or predicting, by the UE 120, uplink duty cycles. The scaling factor may be determined based on least in part on one or more factors to ensure that the total energy consumption by the UE 120 over a compliance window (e.g., over a moving compliance window) is at or below the allowed regulatory level. In some aspects, the scaling factor may be based at least in part on a frequency band used for communicating with the base station 110. In some aspects, the scaling factor may be based at least in part on a configuration of the UE 120. In some aspects, the scaling factor may be based at least in part on an RF front end configuration (e.g., an antenna configuration or hardware configuration) of the UE 120.

In some aspects, the scaling factor may be based at least in part on a compliance window size. For example, as described elsewhere herein, the UE 120 may use a sliding or moving compliance window to ensure that a total energy consumption by the UE 120 over the compliance window satisfies an SAR limit or an MPE limit (or another RF emissions or exposure limit). The compliance window may be 120 seconds, 100 seconds, 60 seconds, or 50 seconds, among other examples. In some aspects, the UE 120 may use an evaluation period to evaluate energy consumption by the UE 120. The evaluation period may be T milliseconds or another amount of time. In other words, the UE 120 may evaluate energy consumption by the UE 120 over the evaluation periods (e.g., over T millisecond time periods). The compliance window size may be a function of (or may be in terms of) an evaluation period. For example, the compliance window size may be 100/T, indicating a compliance window size of 100 seconds.

In some aspects, the scaling factor may be based at least in part on the first transmit power limit (e.g., the average power limit). In some aspects, the scaling factor may be based at least in part on a second transmit power limit. The second transmit power limit may be based at least in part on a capability of the UE 120 or a transmit power constraint associated with the UE 120. For example, the second transmit power limit may be a maximum transmit power level that the UE is capable of ($P_{max}$). For example, the second transmit power limit may be based at least in part on an RF front end configuration of the UE 120 and/or an antenna configuration of the UE 120. In some aspects, the second transmit power limit may be based at least in part on a transmit power limit (e.g., a maximum transmit power) that can be used by the UE 120 for uplink transmissions to the base station 110 (e.g., as indicated by the configuration information). In some aspects, the second transmit power limit may be based at least in part on one or more other limiting factors, such as a maximum power reduction (MPR) value, a power management MPR value, and/or a power back-off value, among other examples. In other words, the second transmit power limit may be based at least in part on one or more static factors (such as a capability of the UE 120) and/or one or more dynamic factors (such as an MPR value). In some aspects, the scaling factor may be based at least in part on a ratio of the second transmit power limit to the first transmit power limit. In some aspects, the scaling factor may be based at least in part on a difference between the first transmit power limit and the second transmit power limit.

In some aspects, the scaling factor may be based at least in part on an uplink duty cycle of the UE 120. For example, the scaling factor may be based at least in part on an actual or a current uplink duty cycle of the UE 120. In some aspects, the scaling factor may be based at least in part on an uplink duty cycle indicated by the configuration information (e.g., an RRC configured uplink duty cycle or a maximum uplink duty cycle). In some aspects, the scaling factor may be based at least in part on a change in the uplink duty cycle (e.g., may be based at least in part on a difference between an uplink duty cycle of the UE 120 at a first time and an uplink duty cycle of the UE 120 at a second time). In some aspects, the scaling factor may be based at least in part on a rate of change of the uplink duty cycle.

In some aspects, the scaling factor may be based at least in part on an estimated uplink duty cycle. For example, the scaling factor may be based at least in part on an estimated uplink duty cycle determined by the UE 120 in accordance with equation (1) or a similar equation. In some aspects, the scaling factor may be based at least in part on a predicted uplink duty cycle. For example, the UE 120 may predict an uplink duty cycle based at least in part on past actions by the base station 110 and/or based at least in part on a model (e.g., a machine learning model), among other examples. The UE 120 may use the predicted uplink duty cycle to determine the scaling factor.

In some aspects, the scaling factor may be based at least in part on a rate of convergence upon an actual uplink duty cycle when the UE 120 estimates the uplink duty cycle. For example, as described elsewhere herein, when an uplink duty cycle changes, there may be a delay or some amount of transient time associated with the UE 120 estimating the uplink duty cycle until the UE 120 converges on the actual (e.g., changed) uplink duty cycle. The scaling factor may be based at least in part on the delay or the amount of transient time associated with the UE 120 estimating the uplink duty cycle until the UE 120 converges on the actual (e.g., changed) uplink duty cycle. For example, the scaling factor may be based at least in part on an estimation filter coefficient (a) (e.g., an IIR filter coefficient) associated with the estimated uplink duty cycle.

In some aspects, the scaling factor may be based at least in part on a rate of change of a transmit power level, as determined by the UE 120, when an uplink duty cycle of the UE 120 changes. For example, as described elsewhere herein, the UE 120 may select a transmit power level by scaling the first transmit power level by an estimated uplink duty cycle (e.g., as depicted by graph 305 in FIG. 3). As shown by the section of graph 305 indicated by reference number 315, the transmit power level may change when the uplink duty cycle of the UE 120 changes. The scaling factor may be based at least in part on the rate of change of the transmit power during a change in the uplink duty cycle (e.g., based at least in part on a slope of the line of graph 305 during a change in the uplink duty cycle).

In some aspects, the scaling factor may be based at least in part on an energy consumption by the UE 120 over a previous time window. For example, the scaling factor may be based at least in part on an amount of energy emitted by the UE 120 over a previous time window (e.g., over a previous compliance window or a previous evaluation period). Additionally, or alternatively, the scaling factor may be based at least in part on an amount of available energy for the UE 120 (e.g., for a current compliance window or an upcoming compliance window). For example, the UE 120 may determine a total amount of energy that can be emitted by the UE 120 (e.g., based at least in part on an SAR limit, an MPE limit, or another limit). The UE 120 may determine an amount of energy that has been emitted by the UE 120 (e.g., during a current compliance window and/or a previous compliance window). The UE 120 may determine the amount of available energy for the UE 120 based at least in part on a difference between the total amount of energy that can be emitted by the UE 120 and the amount of energy that has been emitted by the UE 120. The UE 120 may determine a value of the scaling factor based at least in part on the amount of available energy for the UE 120.

In some aspects, the UE 120 may determine the scaling factor for a first time interval. For example, the UE 120 may determine the scaling factor using one or more of the factors described above using values for the factors during the first time interval. The UE 120 may determine a different scaling factor for a second time interval (e.g., based at least in part on changing conditions or values for the one or more factors between the first time interval and the second time interval). In other words, the scaling factor may change, or may be modified by the UE 120, over time, as explained in more detail elsewhere herein.

The UE 120 may determine the scaling factor to ensure that a total energy consumption over a compliance window is at or below an allowed regulatory level. For example, the UE 120 may modify the first transmit power limit by the scaling factor when selecting or determining a transmit power level, such as by an equation (2) having the following form:

$$\lambda \frac{P_{lim}}{u_f(n)} \quad (2)$$

In equation (2), $\lambda$ corresponds to the scaling factor, $P_{lim}$ corresponds to the first transmit power limit, and $u_f(n)$ corresponds to an estimated uplink duty cycle (e.g., estimated in accordance with equation (1) or a similar equation). To ensure that an SAR limit or an MPE limit (or another limit) is not exceeded for a compliance window, the UE 120 may determine a value for the scaling factor using one or more other equations. For example, the one or more other equations may use values of the compliance window size, the first transmit power limit, the selected transmit power level at a given time, an uplink duty cycle (e.g., an actual uplink duty cycle, an RRC configured uplink duty cycle, an estimated uplink duty cycle, a predicted uplink duty cycle, and/or a change in the uplink duty cycle), the second transmit power limit (e.g., a maximum transmit power limit), and/or any other factor or parameter described herein. For example, the value of the scaling factor may be determined such that an optimized transmit power can be selected while also not exceeding the regulatory limit.

In some aspects, the UE 120 may use the scaling factor (e.g., as determined by the one or more equations) to scale or modify the first transmit power limit, $P_{lim}$. For example, if W is 100 seconds (e.g., 200 using units of 500 milliseconds), $P_{max}$ is 25 dB-milliwatts (dBm), $P_{lim}$ is 17 dBm, and $\alpha$ is 0.1, then $\lambda^*$ may be −0.7 decibel (dB) (e.g., indicating that $P_{lim}$ is to be reduced by −0.7 dB when making transmit power level determinations). As another example, if W is 100 seconds (e.g., 200 using units of 500 milliseconds), $P_{max}$ is 25 dBm, $P_{lim}$ is 17 dBm, and a is 0.4, then $\lambda^*$ may be −0.2 dB (e.g., indicating that $P_{lim}$ is to be reduced by −0.2 dB when making transmit power level determinations). As a result, the value of the scaling factor may be determined based at least in part on one or more factors (as described herein) to ensure that the energy consumed by the UE 120 over a moving or sliding compliance window does not exceed a regulatory limit.

In some aspects, the UE 120 may transmit using multiple transmitters of the UE 120 (e.g., using multiple antennas and/or multiple transmit chains). For example, in a dual connectivity mode, the UE 120 may communicate with a master cell group (MCG) for a first RAT (e.g., an LTE RAT or a 4G RAT) and a secondary cell group (SCG) for a second RAT (e.g., an NR RAT or a 5G RAT). The dual connectivity mode may be an Evolved Universal Mobile Telecommunications System Terrestrial Radio Access (E-UTRA)-NR dual connectivity (ENDC) mode. In the ENDC mode, a UE 120 communicates using an LTE RAT on an MCG, and the UE 120 communicates using an NR RAT on an SCG. However, aspects described herein may apply to an ENDC mode (e.g., where the MCG is associated with an LTE RAT and the SCG is associated with an NR RAT), an NR-E-UTRA dual connectivity (NEDC) mode (e.g., where the MCG is associated with an NR RAT and the SCG is associated with an LTE RAT), an NR dual connectivity (NRDC) mode (e.g., where the MCG is associated with an NR RAT and the SCG is also associated with the NR RAT), or another dual connectivity mode (e.g., (e.g., where the MCG is associated with a first RAT and the SCG is associated with one of the first RAT or a second RAT). The ENDC mode is sometimes referred to as an NR or 5G non-standalone (NSA) mode. Thus, as used herein, "dual connectivity mode" may refer to an ENDC mode, an NEDC mode, an NRDC mode, and/or another type of dual connectivity mode. Similarly, the UE 120 may use multiple transmitters when carrier aggregation is configured. Carrier aggregation is a technology that enables two or more component carriers (CCs, sometimes referred to as carriers) to be combined (e.g., into a single channel) for a single UE 120 to enhance data capacity. For example, carriers can be combined in the same or different frequency bands. In carrier aggregation, a UE 120 may be configured with a primary carrier or primary cell (PCell) and one or more secondary carriers or secondary cells (SCells).

Therefore, a first transmitter of the UE 120 may communicate with a first base station 110 (e.g., a first cell, an MCG, and/or a PCell) and a second transmitter of the UE 120 may communicate with a second base station 110 (e.g., a second cell, an SCG, and/or an SCell). The UE 120 may determine different scaling factors for different transmitters of the UE 120. For example, the UE 120 may determine a first scaling factor for a first transmitter and may determine a second scaling factor for a second transmitter. As the transmitters may use different RATs, different operating frequencies, and/or different configurations, the scaling factors for each transmitter may be different. In some aspects, the UE 120 may apply a scaling factor for a first transmitter (e.g., for a primary transmitter associated with a first cell, an MCG, and/or a PCell) and may not apply a scaling factor for a second transmitter (e.g., for a secondary transmitter associated with a second cell, an SCG, and/or an SCell).

When multiple transmitters are used by the UE 120, an energy allocation between the transmitters may be set (e.g., by the UE 120, by an OEM configuration, and/or by the base station 110). For example, a first percentage of the available energy for the UE 120 may be allocated for a first transmitter (e.g., a primary transmitter) and a second percentage (e.g., a remaining percentage) of the available energy for the UE 120 may be allocated for a second transmitter (e.g., a secondary transmitter). For example, 80% of the available energy may be allocated for the first transmitter and 20% of the available energy may be allocated for the second transmitter. If the first transmitter does not emit the full allocation of energy for the first transmitter (e.g., over a time window), then the remaining energy may be allocated to the second transmitter (e.g., if 80% of the available energy is allocated to the first transmitter, but the first transmitter only consumes 70% of the available energy in a time window, then the second transmitter may consume up to 30% of the available energy in the time window, rather than the originally allocated 20%).

In some aspects, a scaling factor for a transmitter may be based at least in part on the energy allocation between multiple transmitters of the UE 120. For example, the UE 120 may identify an energy allocation between a first transmitter and a second transmitter. The UE 120 may determine a scaling factor for the first transmitter (and/or the second transmitter) based at least in part on the energy allocation (in addition to other factors described herein). For example, if Y is an energy reservation for the second transmitter, then the UE 120 may use a value of Y to determine a value of the scaling factor for the first transmitter.

The UE 120 may determine a scaling factor for the second transmitter in a similar manner, but using (1−Y), rather than Y. As another example, the UE 120 may determine the scaling factor for the second transmitter using another value, Z, that represents an amount of energy available to the second transmitter (e.g., which may be greater than (1−Y) in some cases where the first transmitter uses less than all of the energy available to the first transmitter). As a result, the UE 120 may be enabled to determine scaling factors for multiple transmitters to ensure that a total energy consumption by the UE 120 does not exceed a regulatory limit over a compliance window. Equations described herein are provided as examples. Different equations and/or equivalent equations may be used to determine the scaling factor based at least in part on one or more (or all) of the factors and/or considerations described herein.

As shown by reference number 425, the UE 120 may modify the first transmit power limit based at least in part on the scaling factor associated with the first time interval (e.g., a time interval during which the UE 120 determines the scaling factor). For example, the UE 120 may modify a value of the first transmit power limit by the determined scaling factor. For example, if the first transmit power limit is 17 dBm and the scaling factor is −0.7 dB, then the modified first transmit power limit may be 16.3 dBm. In some aspects, the UE 120 may multiply the first transmit power limit by the scaling factor (e.g., if the scaling factor is represented as a linear number, rather than in the dB domain). The UE 120 may use the modified first transmit power level to select a transmit power level.

For example, as shown by reference number 430, the UE 120 may scale the modified first transmit power limit by the estimated uplink duty cycle (e.g., determined by the UE 120 in accordance with Equation (1)). For example, the UE 120 may determine a ratio of the modified first transmit power limit to the estimated uplink duty cycle (e.g., the UE 120 may divide the modified first transmit power limit by the estimated uplink duty cycle) to obtain a scaled first transmit power limit.

As shown by reference number 435, the UE 120 may select a transmit power level (e.g., to be used by the UE 120). For example, the UE 120 may select the transmit power level based at least in part on the modified first transmit power level and/or the scaled first transmit power limit. The UE 120 may select the transmit power level based at least in part on a ratio of the modified first transmit power limit to the estimated uplink duty cycle and a value of the second transmit power limit (e.g., a maximum transmit power level that the UE is capable of, $P_{max}$). Additionally, the UE 120 may select the transmit power level based at least in part on a past energy usage by the UE 120. For example, the UE 120 may track an energy usage by the UE 120 over a previous time window (e.g., a sliding or moving time window, such as an evaluation period). The UE 120 may select the transmit power level based at least in part on the energy usage by the UE 120 over the previous time window to ensure that regulatory limits (e.g., MPE limits and/or SAR limits) are satisfied.

In some aspects, the UE 120 may identify a lowest value from a value of the modified first transmit power limit divided by the estimated uplink duty cycle (e.g., the scaled first transmit power limit), a value of the second transmit power limit, and/or an available transmit power level that is based at least in part on past energy usage by the UE 120. The UE 120 may select the transmit power level to be the lowest value.

As shown by reference number 440, the UE 120 may transmit a signal using the selected transmit power level. For example, the UE 120 may transmit a signal based at least in part on the modified first transmit power level. In other words, the UE 120 may use a transmit power for the signal that is determined or selected based at least in part on the modified first transmit power level (e.g., the first transmit power level modified by the scaling factor, as described in more detail elsewhere herein).

As shown by reference number 445, the UE 120 may modify the scaling factor (e.g., may modify a value of the scaling factor). For example, as described above, the scaling factor may be for a first time interval. During a second time interval, a value of the scaling factor may be different. For example, the UE 120 may modify the scaling factor based at least in part on a rate of change of estimated uplink duty cycles for the UE 120. For example, the UE 120 may determine a rate of change of estimated uplink duty cycles for the UE 120 over an interval (e.g., over one or more compliance windows and/or over one or more evaluation periods). The UE 120 may determine whether the rate of change of the estimated uplink duty cycles satisfies a threshold. For example, the UE 120 may estimate a set of estimated uplink duty cycles over the time interval. The UE 120 may determine whether a difference between any two consecutive estimated uplink duty cycles, of the set of estimated uplink duty cycles, satisfies the threshold. For example, the difference may be a largest difference or a maximum difference between any two consecutive estimated uplink duty cycles of the set of estimated uplink duty cycles. In some aspects, the difference may be a variance function between estimated uplink duty cycles of the set of estimated uplink duty cycles.

In some aspects, if the rate of change of the estimated uplink duty cycles satisfies the threshold, then the UE 120 may modify a value of the scaling factor to a value of approximately 1 and/or slightly less than 1 (e.g., 1, 0.99, 0.98, and/or similar values). For example, if the rate of change of the estimated uplink duty cycles is low (e.g., if the rate of change satisfies the threshold), then the scaling factor may no longer be required to ensure that the transmit power level does not drop to a reserve level because the uplink duty cycle may not be changing (or may only be slightly changing) during the time interval. Therefore, the scaling factor may be set to a value of approximately one to enable the UE 120 to transmit at a higher transmit level (e.g., rather than reducing the first transmit power level by the scaling factor). In some aspects, if the rate of change of the estimated uplink duty cycles satisfies the threshold, then the UE 120 may modify the scaling factor to the value of approximately one incrementally over a period of time (e.g., may ramp the value of the scaling factor to approximately 1 gradually over time in accordance with a ramping parameter). For example, the scaling factor may be modified to a value of $\lambda+(1-\lambda^*)/V$, where V is a parameter that controls the ramp-up speed (e.g., that controls the amount of time over which the scaling factor is modified to a value of approximately one and/or the rate of change of the value of the scaling factor).

If the rate of change does not satisfy the threshold, then the UE 120 may refrain from modifying the scaling factor. In other words, if the rate of change of the estimated uplink duty cycles for the UE 120 is high (e.g., does not satisfy the threshold), then the scaling factor may be needed to ensure that the total energy consumption by the UE 120 over a compliance window satisfies an aggregate limit (e.g., an SAR limit or an MPE limit) over the compliance window, as described elsewhere herein. For example, if the rate of change of the estimated uplink duty cycles for the UE 120 does not satisfy the threshold, then the UE 120 may determine a value of the scaling factor, as described in more detail elsewhere herein. For example, the UE 120 may determine a value of the scaling factor for $\lambda^*$ (e.g., using Equation (6)).

In some aspects, the UE 120 may modify the scaling factor based at least in part on an amount of energy used by the UE 120 over a period of time (e.g., over one or more compliance windows and/or over one or more evaluation periods). For example, the UE 120 may identify that too much and/or too little energy was consumed by the UE 120 in a past period of time where scaling (e.g., using the scaling factor) was applied. The UE 120 may modify the scaling factor to ensure that the UE 120 emits an optimized amount of energy moving forward (e.g., an amount of energy that is close to, but does not exceed, an allowed energy amount as indicated by a regulatory limit). As a result, the value of the scaling factor may be optimized over time to improve transmit power level determinations and/or selections by the UE 120.

As a result, the UE 120 may use transmit power levels that do not cause the UE 120 to exceed the SAR limit or the MPE limit on aggregate exposure over a compliance window. For example, the UE 120 may be enabled to select an optimized transmit power level (e.g., that is based at least in part on an estimated uplink duty cycle), while also mitigating the risk of exceeding an SAR limit or an MPE limit on aggregate exposure over a compliance window caused by a transition time to the scaled average power limit ($P_{limit}$). Therefore, the UE may not reduce a transmit power level to a reserve power level (e.g., as may have otherwise been needed to ensure that the SAR limit or the MPE limit is satisfied). Avoiding reducing the transmit power level to the reserve power level may improve performance of the UE 120 by enabling the UE 120 to consistently transmit at higher transmit power levels.

As indicated above, FIG. 4 is provided as an example. Other examples may differ from what is described with respect to FIG. 4.

Figure 5:
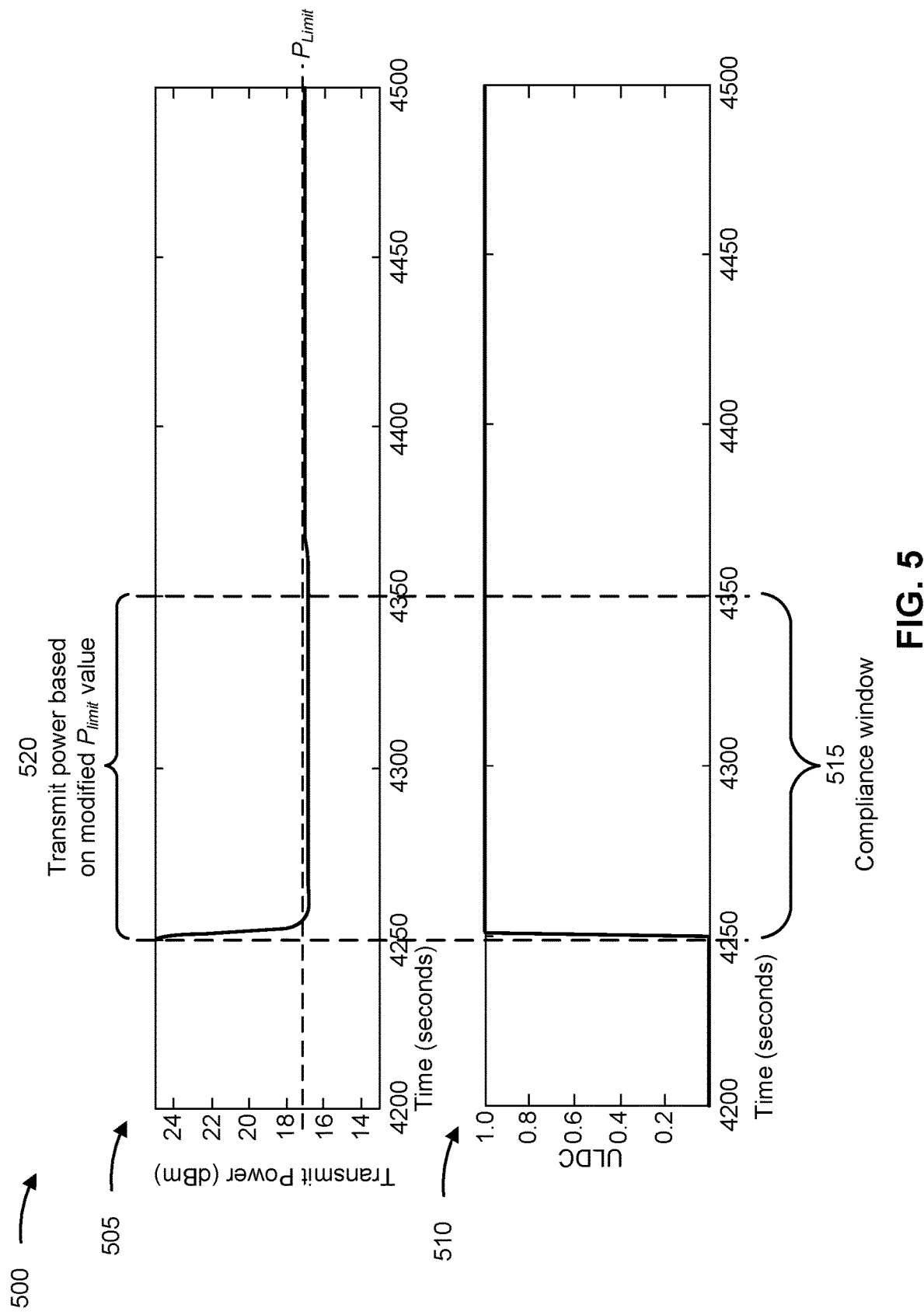
FIG. 5 is a diagram illustrating an example associated with a UE adapting transmit power over a compliance window using a scaled transmit power limit, in accordance with the present disclosure.

FIG. 5 is a diagram illustrating an example 500 associated with a UE adapting transmit power over a compliance window using a scaled transmit power limit, in accordance with the present disclosure. As shown in FIG. 5, and by graph 505, a UE 120 may adjust a transmit power level over time. As shown by graph 510, an uplink duty cycle (ULDC) of the UE 120 may change over time.

As described in more detail elsewhere herein, a UE 120 may determine a transmit power (e.g., an instantaneous transmit power) based on scaling the average power limit ($P_{limit}$) by an uplink duty cycle. For example, the UE may estimate a current uplink duty cycle and may scale the average power limit by the estimated current uplink duty cycle. Additionally, or alternatively, as described in connection with FIG. 4, the UE 120 may determine or select a transmit power based at least in part on a modified average power limit (e.g., modified by a scaling factor as described in more detail elsewhere herein). For example, if the scaling factor is −0.7 dB and the average power limit is 17 dBm, then the UE 120 may determine the transmit power level based at least in part on a modified average power limit of 16.3 dBm. For example, if the uplink duty cycle is 0.5, then the UE 120 may transmit at a transmit power level of 19.3 dBm (e.g., 20 dBm-0.7 dB), as the UE 120 is only transmitting 50% of the time (e.g., resulting in an average transmit power level of 17 dBm, as required by the MPE limit or the SAR limit). As another example, if the uplink duty cycle is 1.0 (or 100%), then the UE 120 may transmit at a transmit power level of 16.3 dBm.

The UE may select the instantaneous transmit power based on a maximum transmit power ($P_{max}$) (e.g., for the UE, for an antenna of the UE, and/or for a serving base station) and the scaled average power limit. Using the scaled average power limit that is based on the estimated current uplink duty cycle and/or the scaling factor may enable the UE to select an optimal transmit power while still ensuring that RF safety requirements are satisfied. For example, as there may be a delay in the estimation of the uplink duty cycle (e.g., as compared to the actual uplink duty cycle), resulting in a delay in a transition to, or a convergence on, the scaled average power limit, the UE 120 may be transmitting at a transmit power level that is greater than the scaled average power limit. As a result, the UE may exceed an SAR limit or an MPE limit on aggregate exposure over the compliance window 515 if the average power limit were not modified by the scaling factor. For example, as shown in FIG. 5, and by reference number 520, the UE 120 may transmit at a modified average power limit (e.g., a reduced average power limit) to account for the time during which the UE 120 may be transmitting at a transmit power level that is greater than the scaled average power limit. As a result, the UE 120 may be enabled to satisfy the SAR limit or the MPE limit on aggregate exposure over the compliance window 515 without reducing a transmit power level to a reserve power level during the compliance window 515, in contrast to the scenario described in connection with FIG. 3.

Additionally, as shown in FIG. 5, if the uplink duty cycle remains constant (or does not significantly change) for a period of time, the UE 120 may be enabled to increase the scaling factor to approximately 1 (e.g., as described in more detail elsewhere herein). Therefore, the UE 120 may be enabled to increase the transmit power level of the UE 120 to a value that is closer to (or equal to) the scaled average power limit ($P_{limit}$) (e.g., scaled by the estimated uplink duty cycle).

As indicated above, FIG. 5 is provided as an example. Other examples may differ from what is described with respect to FIG. 5.

Figure 6:
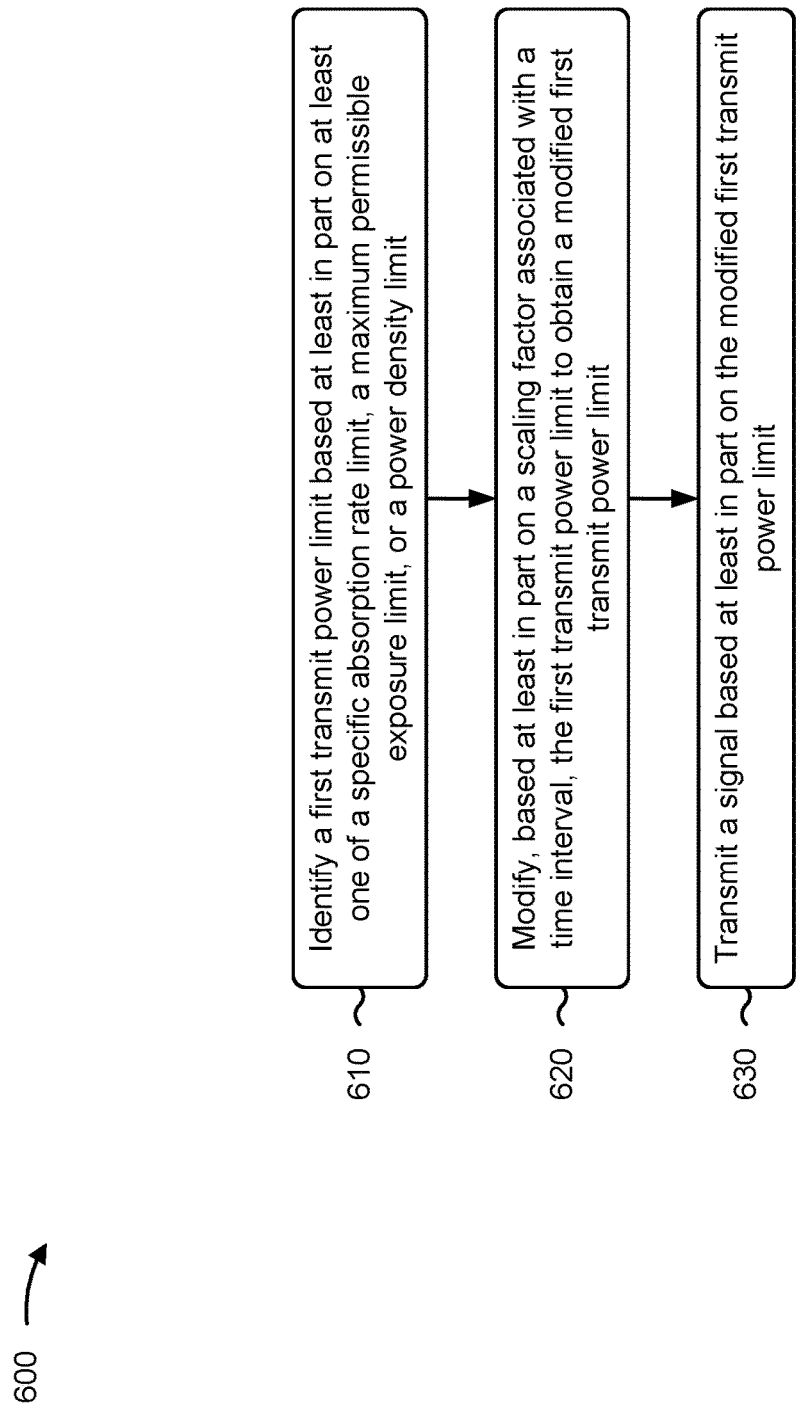
FIG. 6 is a diagram illustrating an example process associated with scaling a transmit power limit, in accordance with the present disclosure.

FIG. 6 is a diagram illustrating an example process 600 performed, for example, by a UE, in accordance with the present disclosure. Example process 600 is an example where the UE (e.g., UE 120) performs operations associated with scaling a transmit power limit.

As shown in FIG. 6, in some aspects, process 600 may include identifying a first transmit power limit based at least in part on at least one of a specific absorption rate limit, a maximum permissible exposure limit, or a power density limit (block 610). For example, the UE (e.g., using communication manager 140 and/or identification component 708, depicted in FIG. 7) may identify a first transmit power limit based at least in part on at least one of a specific absorption rate limit, a maximum permissible exposure limit, or a power density limit, as described above.

As further shown in FIG. 6, in some aspects, process 600 may include modifying, based at least in part on a scaling factor associated with a time interval, the first transmit power limit to obtain a modified first transmit power limit (block 620). For example, the UE (e.g., using communication manager 140 and/or modification component 710, depicted in FIG. 7) may modify, based at least in part on a scaling factor associated with a time interval, the first transmit power limit to obtain a modified first transmit power limit, as described above.

As further shown in FIG. 6, in some aspects, process 600 may include transmitting a signal based at least in part on the modified first transmit power limit (block 630). For example, the UE (e.g., using communication manager 140 and/or transmission component 704, depicted in FIG. 7) may transmit a signal based at least in part on the modified first transmit power limit, as described above.

Process 600 may include additional aspects, such as any single aspect or any combination of aspects described below and/or in connection with one or more other processes described elsewhere herein.

In a first aspect, process 600 includes determining the scaling factor based at least in part on at least one of a compliance window size, the first transmit power limit, a second transmit power limit that is based at least in part on a capability of the UE or a power constraint associated with the UE, an uplink duty cycle, a change in the uplink duty cycle, a predicted uplink duty cycle, an estimated uplink duty cycle, or an estimation filter coefficient associated with the estimated uplink duty cycle.

In a second aspect, alone or in combination with the first aspect, process 600 includes modifying the first transmit power limit by the scaling factor to obtain the modified first transmit power limit, and selecting a transmit power level for the signal based at least in part on a ratio of the modified first transmit power limit to an estimated uplink duty cycle and a value of a second transmit power limit, where the second transmit power limit is based at least in part on a maximum transmit power level that the UE is capable of.

In a third aspect, alone or in combination with one or more of the first and second aspects, process 600 includes modifying the first transmit power limit by the scaling factor to obtain the modified first transmit power limit, identifying a lowest value from a value of the modified first transmit power limit divided by an estimated uplink duty cycle and a value of a second transmit power limit, and selecting a transmit power level for the signal to be the lowest value.

In a fourth aspect, alone or in combination with one or more of the first through third aspects, process 600 includes modifying the scaling factor based at least in part on a rate of change of estimated uplink duty cycles for the UE.

In a fifth aspect, alone or in combination with one or more of the first through fourth aspects, process 600 includes determining a rate of change of estimated uplink duty cycles for the UE over the time interval, and determining whether the rate of change of the estimated uplink duty cycles satisfies a threshold.

In a sixth aspect, alone or in combination with one or more of the first through fifth aspects, process 600 includes modifying the scaling factor to a value of approximately one if the rate of change satisfies the threshold.

In a seventh aspect, alone or in combination with one or more of the first through sixth aspects, modifying the scaling factor includes modifying the scaling factor to the value of approximately one incrementally over a period of time.

In an eighth aspect, alone or in combination with one or more of the first through seventh aspects, process 600 includes refraining from modifying the scaling factor if the rate of change does not satisfy the threshold.

In a ninth aspect, alone or in combination with one or more of the first through eighth aspects, determining the rate of change of the estimated uplink duty cycles includes estimating a set of estimated uplink duty cycles over the time interval, and determining whether the rate of change of the estimated uplink duty cycles satisfies the threshold includes determining whether a difference between any two consecutive estimated uplink duty cycles, of the set of estimated uplink duty cycles, satisfies the threshold.

In a tenth aspect, alone or in combination with one or more of the first through ninth aspects, process 600 includes modifying the scaling factor based at least in part on an amount of energy used by the UE over a period of time or an amount of available energy for the UE over the period of time.

In an eleventh aspect, alone or in combination with one or more of the first through tenth aspects, process 600 includes determining a first scaling factor for a first antenna or for a first group of antennas, and determining a second scaling factor for a second antenna or for a second group of antennas.

In a twelfth aspect, alone or in combination with one or more of the first through eleventh aspects, the UE is operating in a dual connectivity mode with a first transmitter of the UE and a second transmitter of the UE, and process 600 includes determining a first scaling factor for the first transmitter, and determining a second scaling factor for the second transmitter.

In a thirteenth aspect, alone or in combination with one or more of the first through twelfth aspects, the UE is operating in a dual connectivity mode with a first transmitter of the UE and a second transmitter of the UE, the scaling factor is for the first transmitter, and process 600 includes identifying an energy allocation between the first transmitter and the second transmitter, and determining the scaling factor for the first transmitter based at least in part on the energy allocation.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
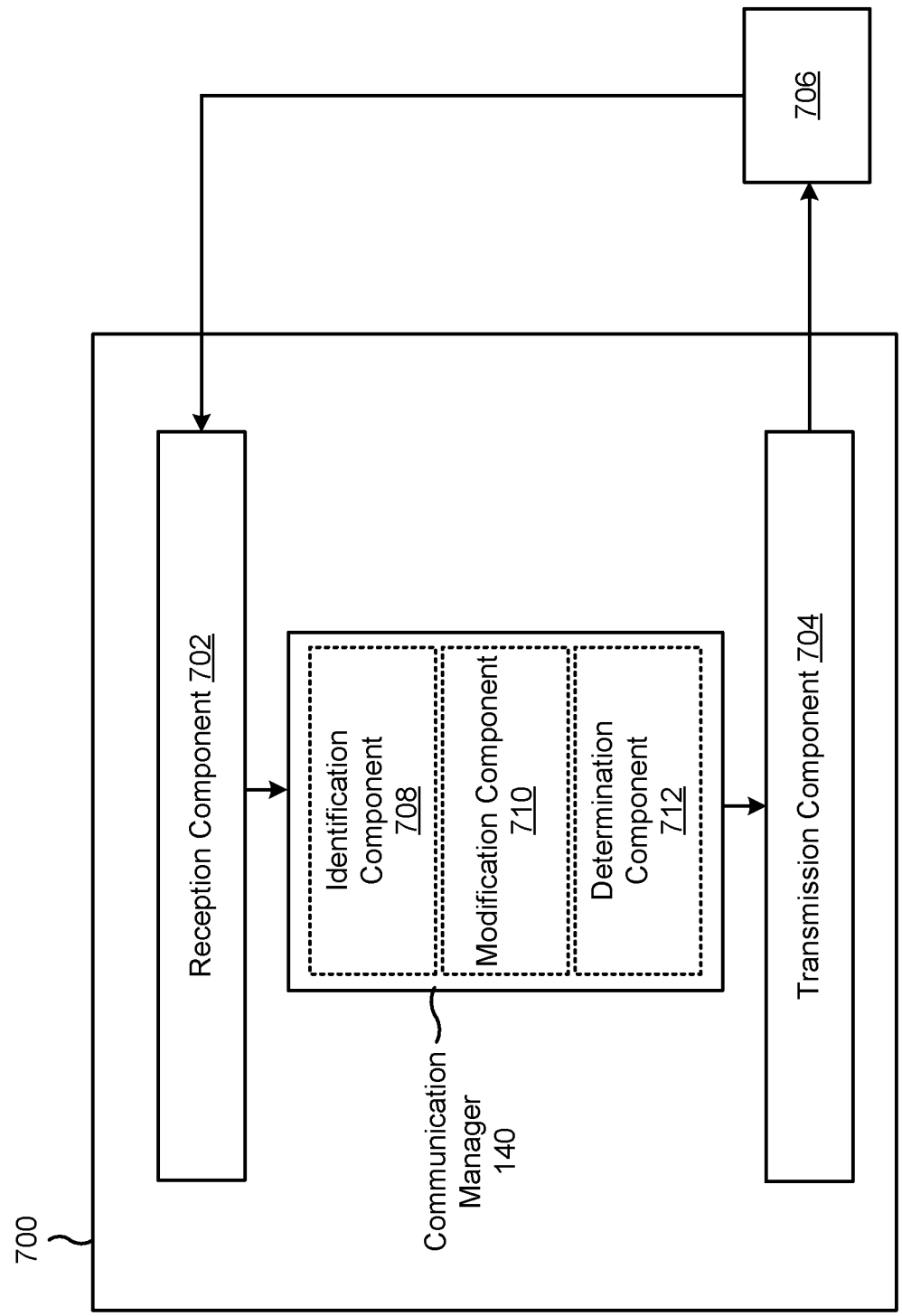
FIG. 7 is a block diagram of an example apparatus for wireless communication, in accordance with the present disclosure.

FIG. 7 is a block diagram of an example apparatus 700 for wireless communication. The apparatus 700 may be a UE, or a UE may include the apparatus 700. In some aspects, the apparatus 700 includes a reception component 702 and a transmission component 704, which may be in communication with one another (for example, via one or more buses and/or one or more other components). As shown, the apparatus 700 may communicate with another apparatus 706 (such as a UE, a base station, or another wireless communication device) using the reception component 702 and the transmission component 704. As further shown, the apparatus 700 may include the communication manager 140. The communication manager 140 may include one or more of an identification component 708, a modification component 710, or a determination component 712, among other examples.

In some aspects, the apparatus 700 may be configured to perform one or more operations described herein in connection with FIGS. 4 and 5. Additionally, or alternatively, the apparatus 700 may be configured to perform one or more processes described herein, such as process 600 of FIG. 6, or a combination thereof. In some aspects, the apparatus 700 and/or one or more components shown in FIG. 7 may include one or more components of the UE described in connection with FIG. 2. Additionally, or alternatively, one or more components shown in FIG. 7 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 702 may receive communications, such as reference signals, control information, data communications, or a combination thereof, from the apparatus 706. The reception component 702 may provide received communications to one or more other components of the apparatus 700. In some aspects, the reception component 702 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 700. In some aspects, the reception component 702 may include one or more antennas, a demodulator, a MIMO detector, a receive processor, a controller/processor, a memory, or a combination thereof, of the UE described in connection with FIG. 2.

The transmission component 704 may transmit communications, such as reference signals, control information, data communications, or a combination thereof, to the apparatus 706. In some aspects, one or more other components of the apparatus 700 may generate communications and may provide the generated communications to the transmission component 704 for transmission to the apparatus 706. In some aspects, the transmission component 704 may perform signal processing on the generated communications (such as filtering, amplification, modulation, digital-to-analog conversion, multiplexing, interleaving, mapping, or encoding, among other examples), and may transmit the processed signals to the apparatus 706. In some aspects, the transmission component 704 may include one or more antennas, a modulator, a transmit MIMO processor, a transmit processor, a controller/processor, a memory, or a combination thereof, of the UE described in connection with FIG. 2. In some aspects, the transmission component 704 may be co-located with the reception component 702 in a transceiver.

The identification component 708 may identify a first transmit power limit based at least in part on at least one of a specific absorption rate limit, a maximum permissible exposure limit, or a power density limit. The modification component 710 may modify, based at least in part on a scaling factor associated with a time interval, the first transmit power limit to obtain a modified first transmit power limit. The transmission component 704 may transmit a signal based at least in part on the modified first transmit power limit.

The determination component 712 may determine the scaling factor based at least in part on at least one of a compliance window size, the first transmit power limit, a second transmit power limit that is based at least in part on a capability of the UE or a power constraint associated with the UE, an uplink duty cycle, a change in the uplink duty cycle, a predicted uplink duty cycle, an estimated uplink duty cycle, or an estimation filter coefficient associated with the estimated uplink duty cycle.

The modification component 710 may modify the first transmit power limit by the scaling factor to obtain the modified first transmit power limit.

The determination component 712 may select a transmit power level for the signal based at least in part on a ratio of the modified first transmit power limit to an estimated uplink duty cycle and a value of a second transmit power limit, wherein the second transmit power limit is based at least in part on a maximum transmit power level that the UE is capable of.

The modification component 710 may modify the first transmit power limit by the scaling factor to obtain the modified first transmit power limit. The identification component 708 may identify a lowest value from a value of the modified first transmit power limit divided by an estimated uplink duty cycle and a value of a second transmit power limit. The determination component 712 may select a transmit power level for the signal to be the lowest value.

The modification component 710 may modify the scaling factor based at least in part on a rate of change of estimated uplink duty cycles for the UE.

The determination component 712 may determine a rate of change of estimated uplink duty cycles for the UE over the time interval. The determination component 712 may determine whether the rate of change of the estimated uplink duty cycles satisfies a threshold.

The modification component 710 may modify the scaling factor to a value of approximately one if the rate of change satisfies the threshold. The modification component 710 may refrain from modifying the scaling factor if the rate of change does not satisfy the threshold.

The modification component 710 may modify the scaling factor based at least in part on an amount of energy used by the UE over a period of time or an amount of available energy for the UE over the period of time.

The determination component 712 may determine a first scaling factor for a first antenna or for a first group of antennas. The determination component 712 may determine a second scaling factor for a second antenna or for a second group of antennas.

The determination component 712 may determine a first scaling factor for a first transmitter. The determination component 712 may determine a second scaling factor for a second transmitter.

The identification component 708 may identify an energy allocation between the first transmitter and the second transmitter. The determination component 712 may determine the scaling factor for the first transmitter based at least in part on the energy allocation.

The number and arrangement of components shown in FIG. 7 are provided as an example. In practice, there may be additional components, fewer components, different components, or differently arranged components than those shown in FIG. 7. Furthermore, two or more components shown in FIG. 7 may be implemented within a single component, or a single component shown in FIG. 7 may be implemented as multiple, distributed components. Additionally, or alternatively, a set of (one or more) components shown in FIG. 7 may perform one or more functions described as being performed by another set of components shown in FIG. 7.

The following provides an overview of some Aspects of the present disclosure:

Aspect 1: A method of wireless communication performed by a user equipment (UE), comprising: identifying a first transmit power limit based at least in part on at least one of a specific absorption rate limit, a maximum permissible exposure limit, or a power density limit; modifying, based at least in part on a scaling factor associated with a time interval, the first transmit power limit to obtain a modified first transmit power limit; and transmitting a signal based at least in part on the modified first transmit power limit.

Aspect 2: The method of Aspect 1, further comprising: determining the scaling factor based at least in part on at least one of: a compliance window size, the first transmit power limit, a second transmit power limit that is based at least in part on a capability of the UE or a power constraint associated with the UE, an uplink duty cycle, a change in the uplink duty cycle, a predicted uplink duty cycle, an estimated uplink duty cycle, or an estimation filter coefficient associated with the estimated uplink duty cycle.

Aspect 3: The method of any of Aspects 1-2, further comprising: modifying the first transmit power limit by the scaling factor to obtain the modified first transmit power limit; and selecting a transmit power level for the signal based at least in part on a ratio of the modified first transmit power limit to an estimated uplink duty cycle and a value of a second transmit power limit, wherein the second transmit power limit is based at least in part on a maximum transmit power level that the UE is capable of.

Aspect 4: The method of any of Aspects 1-3, further comprising: modifying the first transmit power limit by the scaling factor to obtain the modified first transmit power limit; identifying a lowest value from a value of the modified first transmit power limit divided by an estimated uplink duty cycle and a value of a second transmit power limit; and selecting a transmit power level for the signal to be the lowest value.

Aspect 5: The method of any of Aspects 1-4, further comprising: modifying the scaling factor based at least in part on a rate of change of estimated uplink duty cycles for the UE.

Aspect 6: The method of any of Aspects 1-5, further comprising: determining a rate of change of estimated uplink duty cycles for the UE over the time interval; and determining whether the rate of change of the estimated uplink duty cycles satisfies a threshold.

Aspect 7: The method of Aspect 6, further comprising: modifying the scaling factor to a value of approximately one if the rate of change satisfies the threshold.

Aspect 8: The method of Aspect 7, wherein modifying the scaling factor comprises: modifying the scaling factor to the value of approximately one incrementally over a period of time.

Aspect 9: The method of Aspect 6, further comprising: refraining from modifying the scaling factor if the rate of change does not satisfy the threshold.

Aspect 10: The method of any of Aspects 6-9, wherein determining the rate of change of the estimated uplink duty cycles comprises: estimating a set of estimated uplink duty cycles over the time interval; and wherein determining whether the rate of change of the estimated uplink duty cycles satisfies the threshold comprises: determining whether a difference between any two consecutive estimated uplink duty cycles, of the set of estimated uplink duty cycles, satisfies the threshold.

Aspect 11: The method of any of Aspects 1-10, further comprising: modifying the scaling factor based at least in part on an amount of energy used by the UE over a period of time or an amount of available energy for the UE over the period of time.

Aspect 12: The method of any of Aspects 1-11, further comprising: determining a first scaling factor for a first antenna or for a first group of antennas; and determining a second scaling factor for a second antenna or for a second group of antennas.

Aspect 13: The method of any of Aspects 1-12, wherein the UE is operating in a dual connectivity mode with a first transmitter of the UE and a second transmitter of the UE, further comprising: determining a first scaling factor for the first transmitter; and determining a second scaling factor for the second transmitter.

Aspect 14: The method of any of Aspects 1-13, wherein the UE is operating in a dual connectivity mode with a first transmitter of the UE and a second transmitter of the UE, wherein the scaling factor is for the first transmitter, further comprising: identifying an energy allocation between the first transmitter and the second transmitter; and determining the scaling factor for the first transmitter based at least in part on the energy allocation.

Aspect 15: An apparatus for wireless communication at a device, comprising a processor; memory coupled with the processor; and instructions stored in the memory and executable by the processor to cause the apparatus to perform the method of one or more of Aspects 1-14.

Aspect 16: A device for wireless communication, comprising a memory and one or more processors coupled to the memory, the one or more processors configured to perform the method of one or more of Aspects 1-14.

Aspect 17: An apparatus for wireless communication, comprising at least one means for performing the method of one or more of Aspects 1-14.

Aspect 18: A non-transitory computer-readable medium storing code for wireless communication, the code comprising instructions executable by a processor to perform the method of one or more of Aspects 1-14.

Aspect 19: A non-transitory computer-readable medium storing a set of instructions for wireless communication, the set of instructions comprising one or more instructions that, when executed by one or more processors of a device, cause the device to perform the method of one or more of Aspects 1-14.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:
    identifying a first transmit power limit based at least in part on at least one of a specific absorption rate limit, a maximum permissible exposure limit, or a power density limit;
    modifying, based at least in part on a scaling factor associated with a time interval, the first transmit power limit to obtain a modified first transmit power limit; and
    transmitting a signal based at least in part on the modified first transmit power limit.

2. The method of claim 1, further comprising:
    determining the scaling factor based at least in part on at least one of:
    a compliance window size,
        the first transmit power limit,
        a second transmit power limit that is based at least in part on a capability of the UE or a power constraint associated with the UE,
        an uplink duty cycle,
        a change in the uplink duty cycle,
        a predicted uplink duty cycle,
        an estimated uplink duty cycle, or
        an estimation filter coefficient associated with the estimated uplink duty cycle.

3. The method of claim 1, further comprising:
    modifying the first transmit power limit by the scaling factor to obtain the modified first transmit power limit; and
    selecting a transmit power level for the signal based at least in part on a ratio of the modified first transmit power limit to an estimated uplink duty cycle and a value of a second transmit power limit, wherein the second transmit power limit is based at least in part on a maximum transmit power level that the UE is capable of.

4. The method of claim 1, further comprising:
    modifying the first transmit power limit by the scaling factor to obtain the modified first transmit power limit;
    identifying a lowest value from a value of the modified first transmit power limit divided by an estimated uplink duty cycle and a value of a second transmit power limit; and
    selecting a transmit power level for the signal to be the lowest value.

5. The method of claim 1, further comprising:
    modifying the scaling factor based at least in part on a rate of change of estimated uplink duty cycles for the UE.

6. The method of claim 1, further comprising:
    determining a rate of change of estimated uplink duty cycles for the UE over the time interval; and
    determining whether the rate of change of the estimated uplink duty cycles satisfies a threshold.

7. The method of claim 6, further comprising:
    modifying the scaling factor to a value of approximately one if the rate of change satisfies the threshold.

8. The method of claim 7, wherein modifying the scaling factor comprises:
    modifying the scaling factor to the value of approximately one incrementally over a period of time.

9. The method of claim 6, further comprising:
    refraining from modifying the scaling factor if the rate of change does not satisfy the threshold.

10. The method of claim 6, wherein determining the rate of change of the estimated uplink duty cycles comprises:
estimating a set of estimated uplink duty cycles over the time interval; and
wherein determining whether the rate of change of the estimated uplink duty cycles satisfies the threshold comprises:
determining whether a difference between any two consecutive estimated uplink duty cycles, of the set of estimated uplink duty cycles, satisfies the threshold.

11. The method of claim 1, further comprising:
modifying the scaling factor based at least in part on an amount of energy used by the UE over a period of time or an amount of available energy for the UE over the period of time.

12. The method of claim 1, further comprising:
determining a first scaling factor for a first antenna or for a first group of antennas; and
determining a second scaling factor for a second antenna or for a second group of antennas.

13. The method of claim 1, wherein the UE is operating in a dual connectivity mode with a first transmitter of the UE and a second transmitter of the UE, further comprising:
determining a first scaling factor for the first transmitter; and
determining a second scaling factor for the second transmitter.

14. The method of claim 1, wherein the UE is operating in a dual connectivity mode with a first transmitter of the UE and a second transmitter of the UE, wherein the scaling factor is for the first transmitter, further comprising:
identifying an energy allocation between the first transmitter and the second transmitter; and
determining the scaling factor for the first transmitter based at least in part on the energy allocation.

15. A user equipment (UE) for wireless communication, comprising:
one or more memories; and
one or more processors, coupled to the one or more memories, configured to:
identify a first transmit power limit based at least in part on at least one of a specific absorption rate limit, a maximum permissible exposure limit, or a power density limit;
modify, based at least in part on a scaling factor associated with a time interval, the first transmit power limit to obtain a modified first transmit power limit; and
transmit a signal based at least in part on the modified first transmit power limit.

16. The UE of claim 15, wherein the one or more processors are further configured to:
determine the scaling factor based at least in part on at least one of:
a compliance window size,
the first transmit power limit,
a second transmit power limit that is based at least in part on a capability of the UE or a power constraint associated with the UE,
an uplink duty cycle,
a change in the uplink duty cycle,
a predicted uplink duty cycle,
an estimated uplink duty cycle, or
an estimation filter coefficient associated with the estimated uplink duty cycle.

17. The UE of claim 15, wherein the one or more processors are further configured to:
modify the first transmit power limit by the scaling factor to obtain the modified first transmit power limit; and
select a transmit power level for the signal based at least in part on a ratio of the modified first transmit power limit to an estimated uplink duty cycle and a value of a second transmit power limit, wherein the second transmit power limit is based at least in part on a maximum transmit power level that the UE is capable of.

18. The UE of claim 15, wherein the one or more processors are further configured to:
modify the first transmit power limit by the scaling factor to obtain the modified first transmit power limit;
identify a lowest value from a value of the modified first transmit power limit divided by an estimated uplink duty cycle and a value of a second transmit power limit; and
select a transmit power level for the signal to be the lowest value.

19. The UE of claim 15, wherein the one or more processors are further configured to:
modify the scaling factor based at least in part on a rate of change of estimated uplink duty cycles for the UE.

20. The UE of claim 15, wherein the one or more processors are further configured to:
determine a rate of change of estimated uplink duty cycles for the UE over the time interval; and
determine whether the rate of change of the estimated uplink duty cycles satisfies a threshold.

21. The UE of claim 20, wherein the one or more processors are further configured to:
modify the scaling factor to a value of approximately one if the rate of change satisfies the threshold.

22. The UE of claim 21, wherein the one or more processors, to modify the scaling factor, are configured to:
modify the scaling factor to the value of approximately one incrementally over a period of time.

23. The UE of claim 20, wherein the one or more processors are further configured to:
refrain from modifying the scaling factor if the rate of change does not satisfy the threshold.

24. The UE of claim 20, wherein the one or more processors, to determine the rate of change of the estimated uplink duty cycles, are configured to:
estimate a set of estimated uplink duty cycles over the time interval; and
wherein the one or more processors, to determine whether the rate of change of the estimated uplink duty cycles satisfies the threshold, are configured to:
determine whether a difference between any two consecutive estimated uplink duty cycles, of the set of estimated uplink duty cycles, satisfies the threshold.

25. The UE of claim 15, wherein the one or more processors are further configured to:
modify the scaling factor based at least in part on an amount of energy used by the UE over a period of time or an amount of available energy for the UE over the period of time.

26. The UE of claim 15, wherein the one or more processors are further configured to:
determine a first scaling factor for a first antenna or for a first group of antennas; and
determine a second scaling factor for a second antenna or for a second group of antennas.

27. The UE of claim 15, wherein the UE is operating in a dual connectivity mode with a first transmitter of the UE and a second transmitter of the UE, and wherein the one or more processors are further configured to:
  determine a first scaling factor for the first transmitter; and
  determine a second scaling factor for the second transmitter.

28. The UE of claim 15, wherein the UE is operating in a dual connectivity mode with a first transmitter of the UE and a second transmitter of the UE, wherein the scaling factor is for the first transmitter, and wherein the one or more processors are further configured to:
  identify an energy allocation between the first transmitter and the second transmitter; and
  determine the scaling factor for the first transmitter based at least in part on the energy allocation.

29. A non-transitory computer-readable medium storing a set of instructions for wireless communication, the set of instructions comprising:
  one or more instructions that, when executed by one or more processors of a user equipment (UE), cause the UE to:
    identify a first transmit power limit based at least in part on at least one of a specific absorption rate limit, a maximum permissible exposure limit, or a power density limit;
    modify, based at least in part on a scaling factor associated with a time interval, the first transmit power limit to obtain a modified first transmit power limit; and
    transmit a signal based at least in part on the modified first transmit power limit.

30. An apparatus for wireless communication, comprising:
  means for identifying a first transmit power limit based at least in part on at least one of a specific absorption rate limit, a maximum permissible exposure limit, or a power density limit;
  means for modifying, based at least in part on a scaling factor associated with a time interval, the first transmit power limit to obtain a modified first transmit power limit; and
  means for transmitting a signal based at least in part on the modified first transmit power limit.

* * * * *